United States Patent Office 3,057,806
Patented Oct. 9, 1962

3,057,806
FLUORESCENT CRAYONS
Joseph L. Switzer, Gates Mills, Ohio, assignor to Switzer Brothers, Inc., Cleveland, Ohio, a corporation of Ohio
No Drawing. Filed July 23, 1959, Ser. No. 828,929
17 Claims. (Cl. 252—301.2)

This invention relates to fluorescent pencils and crayons and more particularly to daylight fluorescent pencils and crayons having the working characteristics of non-fluorescent colored wax pencils and crayons while still exhibiting satisfactory fluorescent effects.

As now generally understood, daylight fluorescent colors are those which not only selectively reflect a predominant wave band of incident light (subtractive color) but also emit light of substantially the same wave band as the predominantly reflected wave band so as to give the daylight fluorescent colors a distinctive brightness. Such distinctive brightness is characterized by perceptibility of the daylight fluorescent colors at a distance beyond the range of color distinguishability of the brightest subtractive color of the same hue. Such projection of reflected and emitted light in daylight fluorescent colors occurs contrary to the subtractive color theory which holds that visible light energy not selectively reflected is absorbed and dissipated as heat. "Daylight" as used in the term "daylight fluorescence" is understood to be sunlight or artificial light having a substantially continuous spectrum of visible light and near ultra-violet light similar to that of sunlight.

Up to the present time useful daylight fluorescent coating materials have been produced by solvating a daylight fluorescent dye in a resin carrier, the dye being in a concentration which is capable of exhibiting daylight fluorescence. The resin carrier must be transparent or translucent to permit transmission of the fluorescent effect. The resin carrier, with suitable concentration of dye solvated in it, is usually employed in the form of a fine powder or pigment dispersed in a film-forming vehicle for use as paints, printing inks, and the like. The film-forming vehicle must be transparent or translucent to permit transmission of the fluorescent effect. Many efforts have been made to solvate the dyestuff directly in the vehicle or binder but were not successful for two main reasons. Either on drying the dyestuff lost its solvated character and became non-fluorescent or, if it remained solvated, it was so fugitive to light that it would fade seriously in a very short period of time.

When efforts were made to disperse the accepted daylight fluorescent pigments in the normal wax binders and vehicles employed in wax crayons and pencils it was found that the waxes often quenched the fluorescent effect because they were not sufficiently translucent or transparent to activating and/or projected light. Further, even when using a suitably translucent wax binder, the pigments— particularly pigments made from thermoset resins—were so hard they scratched and produced a series of streaks where the hard pigment particles scraped off the wax coating during use of the crayon.

The fluorescent pigments made from the resins of Kazenas U.S. Patent No. 2,809,954, "Thermoplastic Melamine-Sulphonamide-Formaldehyde Resinous Materials and Process for Making Same," were found to be capable of being ground to finer powders than the daylight fluorescent pigments theretofore known; however, when mechanically mixed with conventional crayon and pencil waxes, even these pigment particles were still too coarse and hard to produce a satisfactory crayon or pencil.

Upon reflection, therefore, it appeared that, in order to produce a satisfactory daylight fluorescent wax crayon and pencil, the physical characteristics of resinous daylight fluorescent pigments were too divergent from the requisite physical proportion of a suitable wax vehicle for crayons or pencils. The wax binder in such crayons, usually compounded from an amorphous mixture of natural organic waxes and petroleum waxes, must have a sufficiently high softening point and structural strength to withstand normal handling and writing pressures at room temperatures and, yet, under the pressure and friction of being drawn over a writing surface, melt or soften to produce at the interface of the wax and writing surface, a thin, uniform and continuous film which quickly solidifies to produce the desired marking. When daylight fluorescent pigments, even of the ultra-fine Kazenas type, were dispersed in such wax crayon vehicles, it was evident from the lumpy and streaked marks produced that the resinous pigments, due to their hardness, were biting into the writing surface and interrupting the uniform and continuous film required for a satisfactory marking.

Thus, it appeared that any satisfactory daylight fluorescent wax crayons or pencils would require the direct solvation of the dye into a wax vehicle. Efforts to solvate the daylight fluorescent dyestuffs directly in the conventional wax binders of crayons and so-called "colored" pencils were not successful for the same reasons that direct solvation of the dyestuffs in liquid coating compositions were not successful.

Surprisingly, however, it has been discovered that amides derived from fatty acids acted as excellent carriers for and were completely compatible with fluorescent dyestuffs and pigments, particularly with the dyed thermoplastic pigments of Kazenas. These amide compounds have relatively high melting points, are capable of being formed into shapes by the processes of molding and extruding normally used in the crayon and pencil industry, and further have good release properties from the dies or molds. Why these fatty acid amides containing dispersed resinous daylight fluorescent pigments should, when drawn in the form of a crayon over usual writing surfaces, leave a mark of non-streaked, uniform daylight fluorescent color of a high order of brightness, whereas conventional crayon waxes containing the same kind and proportion of pigments will not, is not known.

Another advantage in the use of these fatty acid amides lies in the previously unreported characteristic that they are basically transparent or translucent when used in high concentrations to both activating light and the colored light emitted by the fluorescent dyes and, thus, do not tend to quench the fluorescent effect.

Commercially available fatty acid amides sold by Armour Chemical Division, Armour and Company, under the trademark "Armid" are particularly useful in the present invention. They are straight chain fatty acids, generally of 6 to 18 carbon atoms in length, in which the carboxyl group has been modified by replacement of the hydroxyl group with an amino group. They have the general empirical formula of $H-(CH_2)nCONH_2$ where $n$ is 5 to 17; although the 18 carbon atom chain may have one or two ethylene links as in 9-octadecenamide and 9-12 octadecadienamide.

In the present invention the crayons or pencils are prepared by mixing the fatty acid amide with a thermoplastic pigment containing a fluorescent dye, melting the mixture and forming the crayon or pencil by extrusion or molding. The material so formed is then encased in paper, wood, or other suitable binding medium to form the finished crayon or pencil. As is customary, the length of the crayon or pencil can be determined either before or after encasing in the outer covering. Other materials can be added in small amounts to increase mold release and other working properties.

Crayons or pencils so made exhibit a high order of daylight fluorescence due to the light transmission properties of the fatty acid amide. They also are of excellent lightfastness due, probably, to the dye being selectively retained in the thermoplastic particles rather than being dispersed by bleed into the fatty acid amide.

The thermoplastic resins particularly suitable for use in the present invention may be formed from an aromatic monosulfonamide having two reactive amide hydrogens, a cyclic aminotriazine having at least two amino groups and formaldehyde or paraformaldehyde. If desired, either or both of the first-mentioned components may be separately reacted with formaldehyde to form a thermoplastic sulfonamide-aldehyde resin or a B-stage (partially condensed) aminotriazine-aldehyde resin, respectively, before being co-condensed. The sulfonamide may comprise toluene sulfonamide, e.g., o- or p-toluene sulfonamide or mixtures thereof, benzene sulfonamides, or the alkyl derivatives of such sulfonamides, aliphatic sulfonamides, and toluene sulfonamide and the like.

The cyclic aminotriazine compound may comprise a compound having at least two amino groups as represented by the following formula:

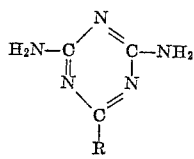

wherein R is hydrogen, alkyl (preferably less than nine carbon atoms), aryl, aralkyl, amino, and the like.

The following are typical aminotriazine compounds within the above formula:

2,4-diamino-1,3,5-triazine
2-methyl-4,6-diamino-1,3,5-triazine
2(3-hydroxy butyl)-4,6-diamino-1,3,5-triazine
2-heptyl-4,6-diamino-1,3,5-triazine
2-phenyl-4,6-diamino-1,3,5-triazine
2-benzyl-4,6-diamino-1,3,5-triazine
2,4,6-triamino-1,3,5-triazine (melamine)

In place of melamine as the aminotriazine compound, one can use methyl melamine or other alkyl derivatives of melamine (i.e., n-alkyl melamines), such as the mono- or dialkyl derivatives where the alkyl group may be methyl, ethyl, propyl, butyl, and the like, up to about eight carbon atoms. Also the B-stage methylol aminotriazine resin can be modified by forming the alkyl ether of the methylol aminotriazine. For example, this can be done by taking an A-stage methylol aminotriazine, i.e., the tri-, tetra-, or pentamethylol aminotriazine, and then converting to the B-stage resin in the presence of an alkanol such as methanol, ethanol, propanol, butanol, and similar alkanols containing up to about eight carbon atoms. When using methanol, the resin would be the mono-, di-methyl ether of tri-, tetra-, or pentamethylol aminotriazine, in partially condensed form. It will be noted that the aminotriazine reacts as an amide rather than as an amine.

The relative quantities of the materials to be co-condensed are critical only to the extent that if too large a quantity of the aminotriazine is used, the final product will be a thermosetting product, which is not desired, and if too small a quantity of the aminotriazine is used, the softening point of the product will differ only slightly from the softening point of the sulfonamide-formaldehyde resin and may not have insolubility in the desired solvents. The lower practical amount of aminotriazine for the purposes of this invention appears to be about ten mol percent of the sulfonamide. Also, the amount of the sulfonamide is dependent upon the number of amino groups in the aminotriazine. For example, it is preferred to use about three times (on a molar basis) as much of the sulfonamide as the aminotriazine when the amino triazine contains two amino groups, and about five times as much sulfonamide when the aminotriazine contains three amino groups.

Thermoplastic pigments of the above type and method of making them are more fully disclosed and claimed in the co-pending application Serial No. 741,213, filed June 11, 1958, of Zenon Kazenas, now United States Patent No. 2,938,873.

The present invention will now be described in greater detail by reference to the following examples:

*Example 1*

360 grams of mixed o- and p-toluene sulfonamine-formaldehyde resins were melted at 60°–70° C. and then heated to 125° C. At this temperature 78.4 grams of B-stage unmodified melamine-formaldehyde resin were added and dissolved therein. The solution became clear at about 150° C. and heating was continued up to 170° C. and held there for about ten minutes. Upon cooling, the co-condensed resin began to solidify at about 115° C. The product (94.5% yield) was a clear water-white resin which, below about 100° C. was brittle, friable, and easily ground in a micro-pulverizer or by wet ball milling into a finely divided powder.

*Example 2*

168 grams of a mixture of o- and p-toluene sulfonamide and 29.4 grams of paraformaldehyde were heated together to a temperature of about 170° C., while stirring, and maintained at that temperature for about twenty minutes. To this resin, at 115–120° C., were added 39 grams of the B-stage unmodified melamine-formaldehyde resin, and the mixture was heated up to 170° C. for fifteen minutes. The resin had a softening point of 115° C. and physical characteristics substantially the same as in Example 1.

*Example 3*

154.1 grams of a mixture of o- and p-toluene sulfonamide were heated to 120° C. 20.1 grams of melamine were then added and stirred at 120° C. for fifteen minutes. 41.3 grams of paraformaldehyde were added in about seven equal portions over a period of about twenty minutes while the temperature was kept at about 115–120° C. After all of the paraformaldehyde was added, the temperature was raised to 170° C. for about fifteen minutes. The product resin had a softening point of about 112° C. The resin had the physical characteristics of the resins in the foregoing examples.

When the procedure of Example 3 was carried out under controlled analytical conditions and the escaping vapors collected it was determined that the formaldehyde which remained in the final product was equal to slightly more than one mol for each mol of sulfonamide and for each mol of melamine used in the reaction.

*Example 4*

The procedure and quantities of reaction products as used in Example 3 were used with the exception that only 15.4 grams of melamine were employed. The resulting resin had a softening point of about 105° C. and had the same general physical characteristics of the resin of Example 3; however, it was determined that this resin was more soluble in common aromatic solvents than was the product of Example 3.

*Example 5*

196.7 grams of a mixture of o- and p-toluene sulfonamide were heated to 115° C. 36.4 grams of paraformaldehyde (95%) were then added slowly with mechanical stirring until thoroughly mixed. 67.8 grams of 2-phenyl-4,6-diamino-1,3,5-triazine and 31.85 grams of additional paraformaldehyde were added with stirring. When the materials were thoroughly mixed, the temperature was raised to 175–180° C. over a period of about 40 minutes and held at that temperature for an additional ten minutes. The resulting product (87.4% yield) had the physical characteristics of the resins in the foregoing Examples 1, 2 and 3.

*Example 6*

When 1.97 grams of brilliant yellow 6G base (4 amino 1,8 naphthal 2′4′ dimethyl phenylimide) and 0.22 gram of rhodamine 6GDN Extra (Color Index No. 752) are incorporated in a resin of Example 1 to 5, particularly when said resin is in a molten state, the final product has an orange-yellow color which is daylight fluorescent when applied to white surfaces as a pigment in a transparent film-forming vehicle. The dyes employed in this case are a combination of a fluorescent naphthalimide dye and a fluorescent xanthene dye.

*Example 7*

If 0.97 gram of rhodamine B Extra (Color Index No. 749) and 0.97 gram of rhodamine 6GDN Extra are incorporated in a resin of Examples 1 to 5, particularly when said resin is in a molten state, the resulting colored resin pigment is a bluish-red which is also daylight fluorescent when applied to a white surface as a pigment in a transparent film-forming vehicle. The dyes employed in this case are a combination of two xanthene dyes.

*Example 8*

If 3.0 grams of brilliant yellow 6G base (fluorescent naphthalimide dye) are incorporated in the resin, the resulting pigment is a lemon yellow which is also daylight fluorescent.

*Example 9*

12 grams of a fatty acid amide mixture having a composition of 8% octanamide, 7% decanamide, 49% dodecanamide, 17% tetradecanamide, 9% hexadecanamide, 2% octadecanamide, 6% 9-octadecenamide and 2% 9-12 octadecadienamide and 15 grams of pigment of Example 7 were mixed together and then heated to approximately 125° C. with stirring. The melt was poured into molds and allowed to cool. The cooled sticks easily released from the mold and were wrapped in paper to produce a paper-wrapped crayon of red daylight fluorescent color and good writing properties.

*Example 10*

To 12 grams of the fatty acid amide mixture of Example 9, 4 grams of a fatty acid amide mixture having a composition of 6% hexadecanamide, 90% octadecanamide, and 4% 9-octadecenamide were added. The resulting 16 grams of mixed fatty acid amides were then mixed with 15 grams of pigment of Example 7 and heated and molded as in Example 9.

*Example 11*

12 grams of a fatty acid amide mixture having a composition of 6% octadecanamide, 91% 9-octadecenamide and 3% 9-12 octadecadienamide were employed in lieu of the mixture of fatty acid amides employed in the procedure of Example 9. The procedure of Example 9 was otherwise followed and a product similar to Example 9 was obtained.

*Example 12*

12 grams of a fatty acid amide mixture having a composition of 22% octadecanamide, 75% 9-octadecenamide and 3% 9-12 octadecadienamide were employed in lieu of the mixture of fatty acid amides employed in the procedure of Example 9. The procedure of Example 9 was otherwise followed and a product similar to Example 9 was obtained.

*Example 13*

12 grams of a fatty acid amide mixture having a composition of 8% octanamide, 7% decanamide, 49% dodecanamide, 17% tetradecanamide, 9% hexadecanamide, 2% octadecanamide, 6% 9-octadecenamide and 2% 9-12 octadecadienamide, 15 grams of resin of Example 1 and .15 gram of rhodamine B Extra were mixed together and then heated to approximately 125° C. with stirring. The melt was poured into molds and allowed to cool. The cooled sticks exhibited a red daylight fluorescent color which was a shade toward the blue.

The above formulations may employ other colored fluorescent pigments as described in Examples 6 and 8 or as further described in the above-noted Kazenas application.

It is also possible and in some cases may be necessary to employ higher temperatures—say 150–170° C.—to obtain the necessary fluidity and mixing of the ingredients to produce satisfactory crayon matrices.

The foregoing examples are given as specific illustrations of the production of crayons and pencils employing fatty acid amides of 6 to 18 carbon atoms as the vehicle for resinous fluorescent pigments and not as limitations. (It is to be understood that the term "crayon," as employed in the appended claims, comprehends and includes the "leads" of colored pencils.) As is evident from the foregoing, the proportions of the fatty acid amides of 6 to 18 carbon atoms in any mixture may be varied to produce different hardnesses to meet the needs of the texture of the writing surfaces upon which the crayons are designed to be used, just as in the case of subtractively-colored wax crayons, the proportions of binder and softening waxes in a binder are varied for the same purpose. Similarly, while the specific class of thermoplastic daylight fluorescent pigments has been found to be particularly useful and compatible, other equally satisfactory pigments may be found and substituted without departing from the spirit and scope of this invention as defined in the appended claims.

What is claimed is:

1. A daylight fluorescent crayon consisting essentially of a binder consisting essentially of a mixture of fatty acid amides having 6 to 18 carbon atoms and an unsubstituted amido group, and coloring matter consisting essentially of a colored thermoplastic resin; said resin consisting essentially of the condensation product of at least one aldehyde component entirely selected from the class consisting of formaldehyde and paraformaldehyde, at least one aromatic monosulfonamide having two reactive amide hydrogens, and at least one aminotriazine having at least two amino groups, the amount of said aminotriazine being between about 10 and 50 mol percent of said monosulfonamide and the amount of said aldehyde component being at least in excess of one mol for each mol of sulfonamide and each mol of aminotriazine, and a daylight fluorescent dye dissolved in said resin, said coloring matter being uniformly dispersed throughout said binder.

2. A daylight fluorescent crayon as described in claim 1 wherein the fluorescent dye is selected from the group consisting of fluorescent naphthalimide and fluorescent xanthene dyes, said dye being present in an amount so as to exhibit daylight fluorescence.

3. A daylight fluorescent crayon as described in claim 1 wherein the mixture of fatty acid amides consists of 8% octanamide, 7% decanamide, 49% dodecanamide, 17% tetradecanamide, 9% hexadecanamide, 2% octadecanamide, 6% 9-octadecenamide and 2% 9-2 octadecadienamide.

4. A daylight fluorescent crayon consisting essentially of a binder consisting essentially of 4 to 6 parts of a mixture of fatty acid amides having 6 to 18 carbon atoms and an unsubstituted amido group, and 5 parts coloring matter consisting essentially of a colored thermoplastic resin, said resin consisting essentially of the condensation product of at least one aldehyde component entirely selected from the class consisting of formaldehyde and paraformaldehyde, at least one aromatic monosulfonamide having two reactive amide hydrogens and at least one aminotriazine having at least two amino groups, the amount of said aminotriazine being between about 10 and 50 mol precent of said monosulfonamide and the amount of said aldehyde component being at least in excess of one mol for each mol of sulfonamide and each mol of aminotriazine and a daylight fluorescent dye dissolved in said resin, said coloring matter being uniformly dispersed throughout said binder.

5. A daylight fluorescent crayon consisting essentially of a binder consisting essentially of 4 parts of a mixture of 8% octanamide, 7% decanamide, 49% dodecanamide, 17% tetradecanamide, 9% hexadecanamide, 2% octadecanamide, 6% 9-octadecenamide and 2% 9-12 octadecadienamide, and 5 parts coloring matter consisting essentially of a colored thermoplastic resin, said resin consisting essentially of the condensation product of at least one aldehyde component entirely selected from the class consisting of formaldehyde and paraformaldehyde, at least one aromatic monosulfonamide having two reactive amide hydrogens and at least one aminotriazine having at least two amino groups the amount of said aminotriazine being between about 10 and 50 mol percent of said monosulfonamide and the amount of said aldehyde component being at least in excess of one mol for each mol of sulfonamide and each mol of aminotriazine and a daylight fluorescent dye dissolved in said resin, said coloring matter being uniformly dispersed throughout said binder.

6. As an article of manufacture, a daylight fluorescent writing crayon consisting essentially of a mixture of at least one transparent thermoplastic resinous pigment, said pigment consisting essentially of the condensation product of at least one aldehyde component selected from the class consisting of formaldehyde and paraformaldehyde, at least one aromatic monosulfonamide having two reactive amide hydrogens, and at least one aminotriazine having at least two amino groups and a daylight fluorescent dyestuff selected from the class consisting of xanthene and naphthalimide fluorescent dyes solvated in said pigment, and binder for said pigments predominantly comprised of at least one fatty acid amide of the class of straight chain fatty acid amides having 6 to 18 carbon atoms in the chain and an unsubstituted amido group.

7. A daylight fluorescent writing crayon as defined in claim 6 including additional daylight fluorescent dyestuff of the class of zanthene and naphthalimide fluorescent dyes solvated in said fatty acid amide binder for the daylight fluorescent pigment.

8. A daylight fluorescent writing crayon as defined in claim 6 in which said resinous carrier consists essentially of the condensation product of at least one aldehyde component entirely selected from the class consisting of formaldehyde and paraformaldehyde, at least one aromatic monosulfonamide having two reactive amide hydrogens and at least one aminotriazine having at least two amino groups, the amount of said aminotriazine being between about 10 and 50 mol percent of said monosulfonamide and the amount of said aldehyde component being at least in excess of one mol for each mol of sulfonamide and each mol of aminotriazine.

9. A daylight fluorescent writing crayon as defined in claim 6 in which the binder for the daylight fluorescent resinous pigment is a mixture of fatty acid amides of the class of straight chain fatty acid amides having 6 to 18 carbon atoms in the chain and an unsubstituted amino group.

10. A daylight fluorescent writing crayon as defined in claim 9 consisting essentially of, by weight, from substantially four to six parts of binder to five parts of pigment.

11. A method of making a daylight fluorescent crayon comprising the steps of dispersing coloring materials consisting essentially of a daylight fluorescent dye dissolved in a thermoplastic resin consisting of the condensation product of at least one aldehyde component entirely selected from the class consisting of formaldehyde and paraformaldehyde, at least one aromatic monosulfonamide having two reactive amide hydrogens and at least one aminotriazine having at least two amino groups, the amount of said aminotriazine being between about 10 and 50 mol percent of said monosulfonamide and the amount of said aldehyde component being at least in excess of one mol for each mol of sulfonamide and each mol of aminotriazine in a binder consisting of a mixture of fatty acid amides having 6 to 18 carbon atoms and an unsubstituted amido group, at a temperature above the melting point of said resin and said binder and forming the crayon while cooling said coloring matter-binder mixture.

12. The method of making a daylight fluorescent crayon as described in claim 11 wherein the temperature employed in melting said resin and said binder is between 125 and 160° C.

13. A method of making a fluorescent crayon as described in claim 11 wherein the fluorescent dyes are selected from the group consisting of fluorescent naphthalimide and fluorescent xanthene dyes, said dyes being present in an amount so as to exhibit daylight fluorescence.

14. A method of making a daylight fluorescent crayon as described in claim 11 wherein the mixture of fatty acid amides consists of 8% octanamide, 7% decanamide, 49% dodecanamide, 17% tetradecanamide, 9% hexadecanamide, 2% octadecanamide, 6% 9-octadecenamide and 2% 9-12 octadecandienamide.

15. A method of making a daylight fluorescent crayon comprising the steps of dispersing five parts coloring material consisting essentially of a daylight fluorescent dye dissolved in a thermoplastic resin consisting of the condensation product of at least one aldehyde component entirely selected from the class consisting of formaldehyde and paraformaldehyde, at least one aromatic monosulfonamide having two reactive amide hydrogens and at least one aminotriazine having at least two amino groups, the amount of said aminotriazine being between about 10 and 50 mol percent of said monosulfonamide and the amount of said aldehyde component being at least in excess of one mol for each mol of sulfonamide and each mol of aminotriazine, in four to six parts of a binder consisting of a mixture of fatty acid amides having 6 to 18 carbon atoms and an unsubstituted amido group, at a temperature above the melting points of said resin and said binder; forming the crayon while cooling said coloring matter-binder mixture; and applying an external covering to the formed crayon.

16. A method of making a daylight fluorescent crayon as described in claim 15 wherein the binder consists of four parts of a mixture of 8% octanamide, 7% decanamide, 49% dodecanamide, 17% tetradecanamide, 9% hexadecanamide, 2% octadecanamide, 6% 9-octadecenamide and 2% 9-12 octadecadienamide.

17. A method of making a daylight fluorescent crayon comprising the steps of dispersing a thermoplastic resin consisting of the condensation product of at least one aldehyde component entirely selected from the class consisting of formaldehyde and paraformaldehyde, at least one aromatic monosulfonamide having two reactive amide hydrogens and at least one aminotriazine having at least two amino groups, the amount of said aminotriazine being between about 10 and 50 mol percent of said monosulfonamide and the amount of said aldehyde component being at least in excess of one mol for each mol of sulfonamide and each mol of amino-triazine and a daylight fluorescent dye in a binder consisting of a mixture of fatty acid amides having 6 to 18 carbon atoms and an unsubstituted amido group, at a temperature above the melting point of said resin and said binder and forming the crayon while cooling said coloring matter-binder mixture.

References Cited in the file of this patent

UNITED STATES PATENTS

| 2,338,176 | Goepfert | Jan. 4, 1944 |
| 2,347,644 | Sell | May 2, 1944 |
| 2,356,408 | Kelley | Aug. 22, 1944 |
| 2,809,954 | Kazenas | Oct. 15, 1957 |
| 2,818,432 | Kirby | Dec. 31, 1957 |

FOREIGN PATENTS

| 562,729 | Canada | Sept. 2, 1958 |